US008504591B2

(12) United States Patent  
Katsumata

(10) Patent No.: US 8,504,591 B2  
(45) Date of Patent: Aug. 6, 2013

(54) DATA GENERATING DEVICE AND DATA GENERATING METHOD, AND DATA PROCESSING DEVICE AND DATA PROCESSING METHOD

(75) Inventor: Mitsuru Katsumata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/179,697

(22) Filed: Jul. 11, 2011

(65) Prior Publication Data

US 2012/0030253 A1 Feb. 2, 2012

(30) Foreign Application Priority Data

Aug. 2, 2010 (JP) ................................. 2010-173600

(51) Int. Cl.
*G06F 17/30* (2006.01)

(52) U.S. Cl.
CPC ....... *G06F 17/30017* (2013.01); *Y10S 707/913* (2013.01)
USPC .......................................... 707/804; 707/913

(58) Field of Classification Search
CPC ................................................. G06F 17/30017
USPC ......................................... 707/804, 913, 914
See application file for complete search history.

(56) References Cited

U.S. PATENT DOCUMENTS

| 5,999,696 | A | 12/1999 | Tsuga et al. | |
|---|---|---|---|---|
| 7,613,727 | B2 | 11/2009 | Visharam et al. | |
| 2003/0163477 | A1 | 8/2003 | Visharam et al. | |
| 2005/0002418 | A1 | 1/2005 | Yang et al. | |
| 2006/0165381 | A1* | 7/2006 | Eckleder et al. | ............... 386/95 |
| 2008/0232774 | A1* | 9/2008 | Ikeda et al. | ............... 386/95 |
| 2008/0285948 | A1 | 11/2008 | Iwase et al. | |
| 2009/0041430 | A1* | 2/2009 | Ishizaka et al. | ............... 386/112 |
| 2009/0096864 | A1* | 4/2009 | Hwang et al. | ............... 348/42 |
| 2010/0121634 | A1* | 5/2010 | Muesch | ............... 704/224 |
| 2010/0271366 | A1* | 10/2010 | Sung et al. | ............... 345/419 |

FOREIGN PATENT DOCUMENTS

| EP | 1 487 216 A2 | 12/2004 |
|---|---|---|
| EP | 1 855 287 A1 | 11/2007 |
| EP | 1 921 622 A2 | 5/2008 |
| JP | 2004-227633 | 8/2004 |
| JP | 2005-524128 | 8/2005 |
| JP | 2005-525627 | 8/2005 |
| JP | 2005-527885 | 9/2005 |
| JP | 2006-507553 | 3/2006 |
| WO | WO 03/073768 A1 | 9/2003 |
| WO | WO 03/073770 A1 | 9/2003 |
| WO | WO 2004/010701 A1 | 1/2004 |

OTHER PUBLICATIONS

Extended European Search Report issued Nov. 7, 2011, in Patent Application No. 11173118.8.
"MPEG-4 Overview—(V.21—Jeju Version)", Inetrnational Organisation for Standardisation, http://mpeg.chiariglione.org/standards/mpeg-4/mpeg-4.htm, ISO/IEC JTC1/SC29/WG11, No. N4668, XP 002637618, Mar. 2002, pp. 1-44.
European Office Action Issued Sep. 27, 2012 in Patent Application No. 11 173 118.8.

* cited by examiner

*Primary Examiner* — Miranda Le
(74) *Attorney, Agent, or Firm* — Oblon, Spivak, McClelland, Maier & Neustadt, L.L.P.

(57) ABSTRACT

Disclosed herein is a data generating device including: a coding section coding a plurality of kinds of data, and generating coded data; an information generating section generating a plurality of pieces of group information indicating combinations of a plurality of kinds of the data; and a file generating section generating a coded data storage file including the coded data of the plurality of kinds of the data and the plurality of pieces of the group information.

9 Claims, 14 Drawing Sheets

| track id | METADATA |
|---|---|
| 1,2 | DUBBED IN JAPANESE (5.1ch) |
| 1,3 | DUBBED IN JAPANESE (2ch) |
| 1,4 | English (5.1ch) |
| 1,4,5 | English (5.1ch, Japanese subtitle ) |
| 1,4,6 | English (5.1ch, JAPANESE COMMENT) |

F I G. 3

```
1:  aligned(8) class PresentationTrackGroupBox extends Box('PTGP') {
2:      unsigned int(16) number_of_presentations;
3:      for(i=1; i≤number_of_presentations; i++) {
4:          unsigned int(16) presentation_unit_size;         ⎫
5:          unsigned int(16) number_of_track_IDs;            ⎬ presentation_unit
6:          for(j=1; j≤number_of_track_IDs; j++) {           ⎪
7:              unsigned int(32) track_ID;                   ⎪
8:          }                                                ⎪
9:          bit(8) metadata[ ];                              ⎭
10:     }
11: }
```

FIG.4

| track id | stream | CONTENTS |
|---|---|---|
| 1 | video | 2D AMERICAN MOVIE |
| 2 | audio 1 | 5.1-ch  JAPANESE |
| 3 | audio 2 | 2-ch  JAPANESE |
| 4 | audio 3 | 5.1-ch  English |
| 5 | subtitle 1 | 2D SUBTITLES FOR JAPANESE |
| 6 | subtitle 2 | 2D COMMENT IMAGE FOR JAPANESE |

FIG.5

| track id | METADATA |
|---|---|
| 1,2 | DUBBED IN JAPANESE (5.1ch) |
| 1,3 | DUBBED IN JAPANESE (2ch) |
| 1,4 | English (5.1ch) |
| 1,4,5 | English (5.1ch, Japanese subtitle ) |
| 1,4,6 | English (5.1ch, JAPANESE COMMENT) |

FIG. 6

| track id | stream | CONTENTS |
|---|---|---|
| 1 | video | 2D AMERICAN MOVIE |
| 2 | audio 1 | 2-ch  JAPANESE |
| 3 | audio 2 | 2-ch  English |
| 4 | subtitle 1 | 2D FORCED SUBTITLES (FOR JAPANESE AUDIO) |
| 5 | subtitle 2 | (2D SUBTITLES FOR JAPANESE +2D FORCED SUBTITLES) |

FIG. 7

| track id | METADATA |
|---|---|
| 1,2,4 | DUBBED IN JAPANESE (FORCED SUBTITLES) |
| 1,3,5 | ENGLISH AUDIO (JAPANESE SUBTITLES+FORCED SUBTITLES) |

| track id | stream | CONTENTS |
|---|---|---|
| 1 | video 1 | 2D AMERICAN MOVIE |
| 2 | video 2 | CONVERSION IMAGE OF AMERICAN MOVIE |
| 3 | audio 1 | 2-ch  JAPANESE |
| 4 | audio 2 | 2-ch  English |
| 5 | subtitle 1 | 2D SUBTITLES FOR JAPANESE |
| 6 | subtitle 2 | 3D SUBTITLES FOR JAPANESE |
| 7 | subtitle 3 | 3D SUBTITLES FOR JAPANESE (aligned) |

FIG.10

| track id | METADATA |
|---|---|
| 1,3 | [2D] DUBBED IN JAPANESE |
| 1,4,5 | [2D] ENGLISH AUDIO, JAPANESE SUBTITLES |
| 1,2,3 | [3D] DUBBED IN JAPANESE |
| 1,2,4,6 | [3D] ENGLISH AUDIO, JAPANESE SUBTITLES |
| 1,2,4,7 | [3D] ENGLISH AUDIO, JAPANESE SUBTITLES 2 |

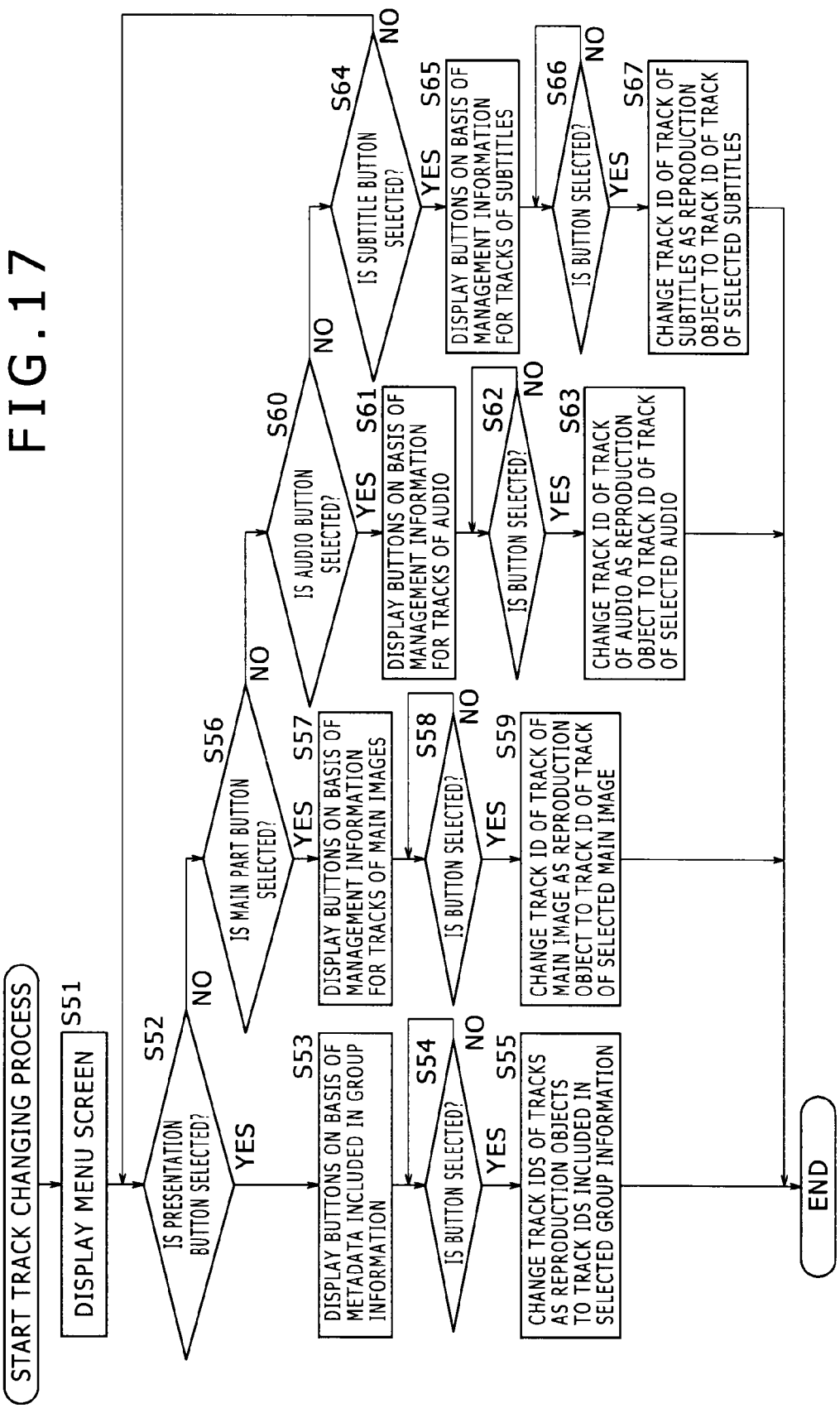

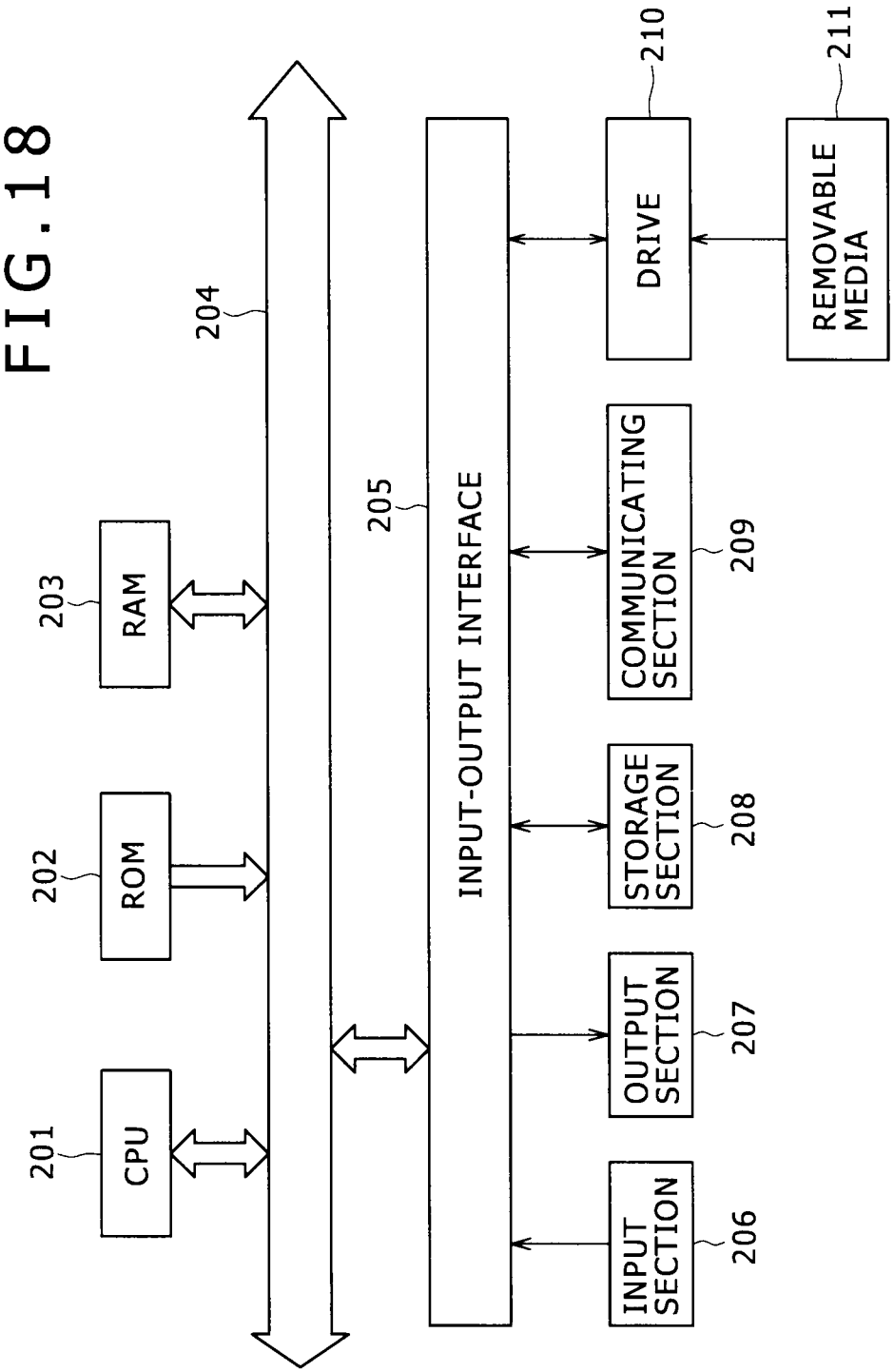

DATA GENERATING DEVICE AND DATA GENERATING METHOD, AND DATA PROCESSING DEVICE AND DATA PROCESSING METHOD

BACKGROUND

The present disclosure relates to a data generating device and a data generating method, and a data processing device and a data processing method, and particularly to a data generating device and a data generating method, and a data processing device and a data processing method, which allow a desired combination of a plurality of kinds of data to be easily selected as reproduction objects.

MP4 is a file format for storing data coded by an MPEG-4 (Moving Picture Experts Group phase 4) system or the like, and is defined in ISO/IEC 14496. MP4 is described in JP-T-2006-507553, JP-T-2005-524128, JP-T-2005-527885, JP-T-2005-525627, Japanese Patent Laid-Open No. 2004-227633 (referred to as Patent Documents 1 to 5 respectively, hereinafter), for example.

In the past, AV (Audio Video) data such as a main image (Video), audio (Audio), a secondary image (Subtitle), and the like is stored in an MP4 file on a track-by-track basis. Incidentally, a track is a unit of AV data that can be managed independently. In addition, in an MP4 file, tracks of a same kind (for example main images, audio, secondary images and the like) can be grouped.

SUMMARY

However, tracks of different kinds have not been able to be grouped. Thus, a plurality of kinds of tracks have not been able to be grouped. As a result, when tracks of respective kinds set as initial values of reproduction objects are not tracks intended by a user, the user needs to select a desired track for each kind, and thereby change the tracks as reproduction objects.

For example, when the user desires to listen to audio for English and view subtitles for Japanese as a secondary image together with a movie as a main image, and the tracks of the movie and audio for Japanese are set as initial values of reproduction objects, the user needs to select the track of audio for English as the track of audio as a reproduction object, and select the track of subtitles for Japanese as the track of a secondary image as a reproduction object, which is troublesome. There is thus a desire to enable a desired combination of a plurality of kinds of tracks to be easily selected as reproduction objects.

The present disclosure has been made in view of such a situation. It is desirable to enable a desired combination of a plurality of kinds of data to be easily selected as reproduction objects.

According to a first embodiment of the present disclosure, there is provided a data generating device including: a coding section coding a plurality of kinds of data, and generating coded data; an information generating section generating a plurality of pieces of group information indicating combinations of a plurality of kinds of the data; and a file generating section generating a coded data storage file including the coded data of the plurality of kinds of the data and the plurality of pieces of the group information.

A data generating method according to the first embodiment of the present disclosure corresponds to the data generating device according to the first embodiment of the present disclosure.

In the first embodiment of the present disclosure, a plurality of kinds of data are coded, coded data is generated, a plurality of pieces of group information indicating combinations of a plurality of kinds of the data are generated, and a coded data storage file including the coded data of the plurality of kinds of the data and the plurality of pieces of the group information is generated.

According to a second embodiment of the present disclosure, there is provided a data processing device including: an obtaining section obtaining a coded data storage file including coded data of a plurality of kinds of data and a plurality of pieces of group information indicating combinations of a plurality of kinds of the data; a display controlling section making a screen for selecting a combination indicated by the group information displayed on a basis of the plurality of pieces of the group information; a selecting section selecting a combination of data as a reproduction object from the combinations indicated by the plurality of pieces of the group information according to an input from a user to the screen; and a decoding section decoding the coded data of all the data included in the combination selected by the selecting section.

A data processing method according to the second embodiment of the present disclosure corresponds to the data processing device according to the second embodiment of the present disclosure.

In the second embodiment of the present disclosure, a coded data storage file including coded data of a plurality of kinds of data and a plurality of pieces of group information indicating combinations of a plurality of kinds of the data is obtained, a screen for selecting a combination indicated by the group information is displayed on a basis of the plurality of pieces of the group information, a combination of data as a reproduction object is selected from the combinations indicated by the plurality of pieces of the group information according to an input from a user to the screen, and the coded data of all the data included in the selected combination is decoded.

According to the first embodiment of the present disclosure, it is possible to generate a file that enables a desired combination of a plurality of kinds of data to be easily selected as a reproduction object.

According to the second embodiment of the present disclosure, a desired combination of a plurality of kinds of data can be easily selected as a reproduction object.

BRIEF DESCRIPTION OF THE DRAWINGS

FIG. 3 is a diagram showing an example of description of a presentation track group box;

FIG. 4 is a diagram showing a first example of tracks;

FIG. 5 is a diagram showing an example of group information in a case where the tracks shown in FIG. 4 are recorded;

FIG. 6 is a diagram showing a second example of tracks;

FIG. 7 is a diagram showing an example of group information in a case where the tracks shown in FIG. 6 are recorded;

FIG. 10 is a diagram showing an example of group information in a case where the tracks shown in FIG. 8 are recorded;

FIG. 17 is a flowchart of assistance in explaining a track changing process; and FIG. 18 is a diagram showing an example of configuration of one embodiment of a computer.

DETAILED DESCRIPTION OF THE PREFERRED EMBODIMENT

[Example of Configuration of an Embodiment of Recording Device]

Figure 1:
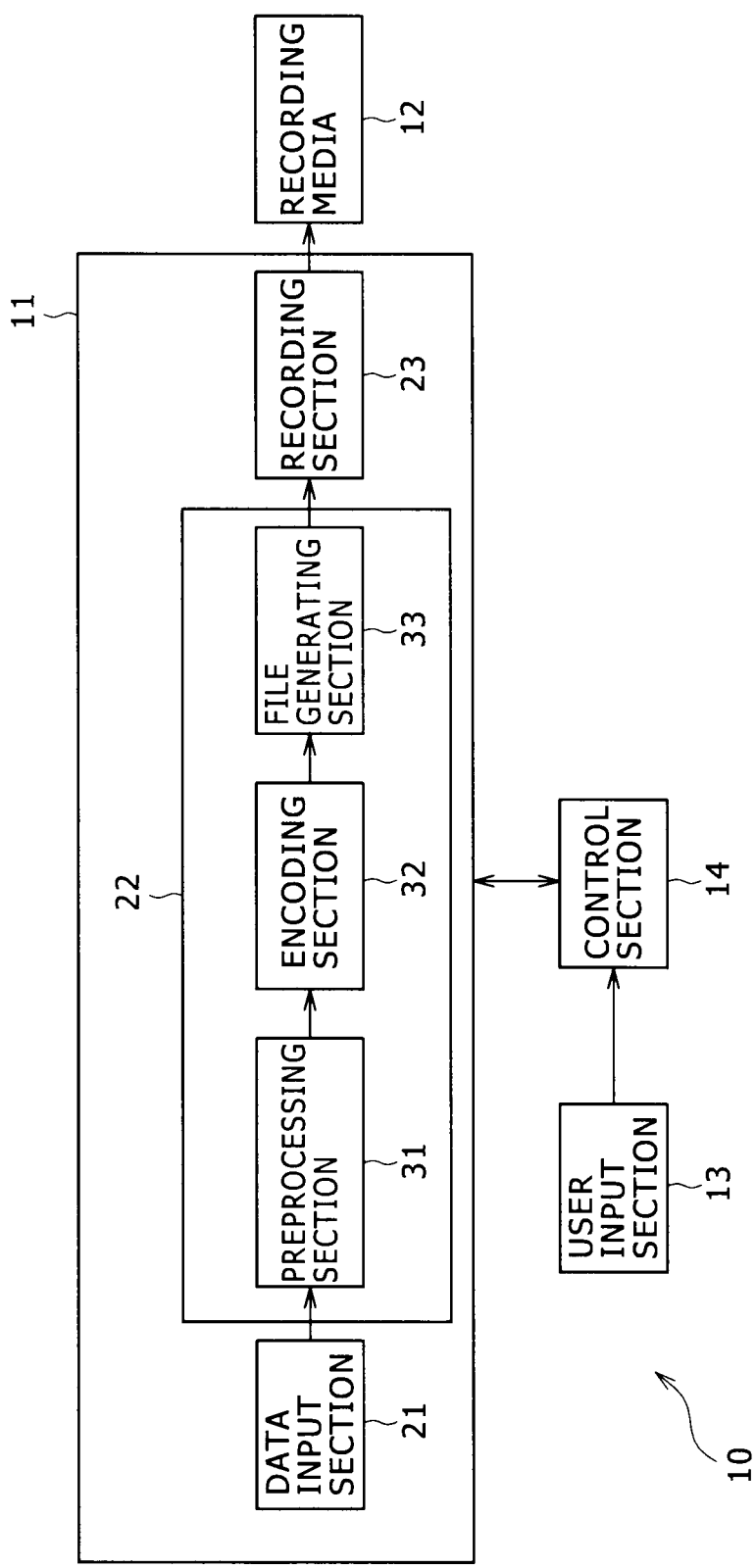
FIG. 1 is a block diagram showing an example of configuration of one embodiment of a recording device as a data generating device to which the present technology is applied.

FIG. 1 is a block diagram showing an example of configuration of an embodiment of a recording device as a data generating device to which the present technology is applied.

The recording device 10 of FIG. 1 includes a recording processing section 11, recording media 12, a user input section 13, and a control section 14. The recording device 10 generates and records an MP4 file of AV data.

Specifically, the recording processing section 11 includes a data input section 21, a data coding section 22, and a recording section 23.

The data input section 21 in the recording processing section 11 obtains AV data in track units from the outside of the recording device 10. The AV data includes 2D main images, 3D main images, images for conversion from 2D main images to 3D main images (which images for the conversion will hereinafter be referred to as conversion images), audio for various languages, 2D secondary images for various languages, 3D secondary images for various languages, and the like.

Incidentally, a 3D main image includes for example a main image for a left eye and a main image for a right eye. The same is true for a 3D secondary image. A conversion image is one of a main image for a left eye and a main image for a right eye. A 2D main image is used as the other at a time of reproduction of the conversion image. Secondary images include subtitles, comment images, menu screens, and the like.

The data input section 21 (information generating means) generates group information indicating a combination of at least two kinds of tracks of a main images, audio, and a secondary image according to an instruction from the control section 14. The data input section 21 supplies the AV data and the group information to the data coding section 22.

The data coding section 22 includes a preprocessing section 31, an encoding section 32, and a file generating section 33. The data coding section 22 generates an MP4 file.

Specifically, the preprocessing section 31 in the data coding section 22 applies the preprocessing of a predetermined system to the AV data in track units of 3D main images and 3D secondary images as 3D images supplied from the data input section 21. The predetermined system includes a frame sequential system, a side by side system, a top and bottom system, and the like.

The preprocessing of the frame sequential system is processing for alternately outputting the AV data of an image for a left eye and an image for a right eye which images form a 3D image. The preprocessing of the side by side system is processing for generating the AV data of images, of which an image for a left eye which image forms a 3D image is disposed in one of a left region and a right region on a screen and of which an image for a right eye is disposed in the other region, from the AV data of the 3D image, and outputting the AV data of the images. The preprocessing of the top and bottom system is processing for generating the AV data of images, of which an image for a left eye which image forms a 3D image is disposed in one of an upper region and a lower region on a screen and of which an image for a right eye is disposed in the other region, from the AV data of the 3D image, and outputting the AV data of the images.

In addition, the preprocessing section 31 supplies the encoding section 32 with AV data other than the AV data of 3D main images and 3D secondary images and the group information as they are.

The encoding section 32 (coding means) codes the AV data in track units which AV data is supplied from the preprocessing section 31 by a system in accordance with MP4. For example, the encoding section 32 codes the AV data of a main image by an MPEG-1 system, an MPEG-2 system, an MPEG-4 system or the like, and codes the AV data of a secondary image by a JPEG (Joint Photographic Experts Group) system, a PNG (Portable Network Graphics) system or the like. In addition, the encoding section 32 codes the AV data of audio by an AAC (Advanced Audio Coding) system, an MP3 (Moving Picture Experts Group Audio Layer-3) system or the like.

The encoding section 32 supplies an AV stream in track units which AV stream is obtained as a result of the coding to the file generating section 33. The encoding section 32 also supplies the file generating section 33 with the group information as it is.

The file generating section 33 (file generating means) generates an MP4 file using the AV stream in track units and the group information that are supplied from the encoding section 32 as well as management information for each track which management information is supplied from the control section 14. The file generating section 33 supplies the generated MP4 file to the recording section 23.

The recording section 23 supplies the MP4 file supplied from the file generating section 33 to the recording media 12 to make the MP4 file recorded on the recording media 12.

The recording media 12 are formed by a flash memory, an HDD (Hard Disk Drive), a DVD (Digital Versatile Disk), and the like.

The user input section 13 includes an operating button and the like. The user input section 13 receives an instruction from a user, and supplies the instruction to the control section 14.

The control section 14 performs processing such as control and the like on each part of the recording processing section 11. For example, the control section 14 determines a coding system for each track according to an instruction from the user input section 13, and controls the encoding section 32 so as to code each track by the coding system. In addition, the control section 14 generates management information including a track ID, which is an ID unique to each track, information indicating the contents of the track, the coding system, and the like according to an instruction from the user input section 13, and supplies the management information to the file generating section 33.

[Example of Configuration of MP4 File]

Figure 2:
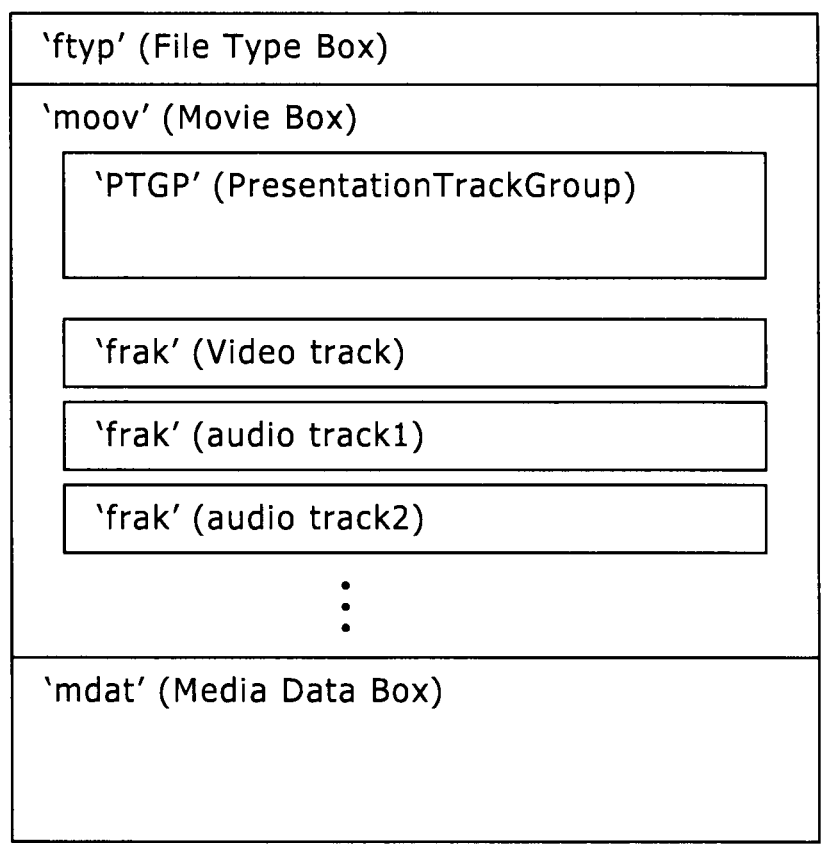
FIG. 2 is a diagram showing an example of configuration of an MP4 file.

FIG. 2 is a diagram showing an example of configuration of an MP4 file generated by the file generating section 33.

As shown in FIG. 2, the MP4 file has an object-oriented data structure. Each object is referred to as a box (Box).

The MP4 file of FIG. 2 includes a file type box (ftyp), a movie box (moov), and a real data box (mdat).

Information on a file type is disposed in the file type box.

Management information for an AV stream in track units which AV stream is disposed in the real data box is disposed in the movie box. Specifically, the movie box includes a presentation track group box (PTGP) in which group information is disposed, a box (trak) for each track in which management information for each track is disposed, and the like.

The AV stream is disposed in track units in the real data box.

[Example of Description of Presentation Track Group Box]

FIG. 3 is a diagram showing an example of description of a presentation track group box.

A description "for (i=1; i≦number_of_presentations; i++)" in a third row of the description of the presentation track group box shown in FIG. 3 indicates that a description in a fourth to a ninth row is repeated a number of times which number is equal to the number of pieces of group information. That is, the description in the fourth to ninth rows is group information.

Specifically, a description "presentation_unit_size" in the fourth row indicates the data size of the group information. A description "number_of_track_IDs" in the fifth row indicates the number of track IDs of tracks included in a combination indicated by the group information. A description "for (j=1; j≦number_of_track_IDs; j++)" in the sixth row indicates that a description in the seventh row is repeated a number of times which number is equal to the number of track IDs of tracks included in the combination indicated by the group information. A description "track_ID" in the seventh row indicates the track ID of a track included in the combination indicated by the group information. A description "metadata" in the ninth row represents metadata indicating the contents of tracks included in the combination indicated by the group information. This metadata is for example character data coded by a UTF16BE system, and is data ending with a NULL character.

As described above, the size of the group information, the number of all tracks included in the combination indicated by the group information and the track IDs of the tracks, and the metadata are described for each piece of group information in the presentation track group box.

[Example of Tracks and Group Information]

FIGS. 4 to 10 are diagrams of assistance in explaining examples of tracks and group information recorded on the recording media 12.

FIG. 4 is a diagram showing a first example of tracks recorded on the recording media 12.

In the example of FIG. 4, six tracks having track IDs of 1 to 6 are recorded on the recording media 12. The track having the track ID "1" is the track of a main image, and is formed by the image data of a 2D American movie. The track having the track ID "2" is a first audio track, and is formed by the audio data of 5.1-ch audio for Japanese. The track having the track ID "3" is a second audio track, and is formed by the audio data of 2-ch audio for Japanese. The track having the track ID "4" is a third audio track, and is formed by the audio data of 5.1-ch audio for English.

The track having the track ID "5" is the track of a first secondary image, and is formed by the image data of 2D subtitles for Japanese. The track having the track ID "6" is the track of a second secondary image, and is the image data of a 2D comment image for Japanese. This comment image is for example an image showing a Japanese translation of a comment by a director of the 2D American movie.

FIG. 5 is a diagram showing an example of group information in a case where the tracks shown in FIG. 4 are recorded on the recording media 12.

In the example of FIG. 5, five pieces of group information are recorded on the recording media 12. The first group information includes track IDs "1" and "2" and metadata "Dubbed in Japanese (5.1 ch)." That is, the first group information indicates a combination of the track of the image of the 2D American movie which track has the track ID "1" and the track of the 5.1-ch audio for Japanese which track has the track ID "2." The image and audio reproduced on the basis of this first group information is a 5.1-ch Japanese-dubbed version of the 2D American movie.

The second group information includes track IDs "1" and "3" and metadata "Dubbed in Japanese (2 ch)." That is, the second group information indicates a combination of the track of the image of the 2D American movie which track has the track ID "1" and the track of the 2-ch audio for Japanese which track has the track ID "3." The image and audio reproduced on the basis of this second group information is a 2-ch Japanese-dubbed version of the 2D American movie.

The third group information includes track IDs "1" and "4" and metadata "English (5.1 ch)." That is, the third group information indicates a combination of the track of the image of the 2D American movie which track has the track ID "1" and the track of the 5.1-ch audio for English which track has the track ID "4." The image and audio reproduced on the basis of this third group information is the 2D American movie.

The fourth group information includes track IDs "1," "4," and "5" and metadata "English (5.1 ch, Japanese Subtitle)." That is, the fourth group information indicates a combination of the track of the image of the 2D American movie which track has the track ID "1," the track of the 5.1-ch audio for English which track has the track ID "4," and the track of the 2D subtitles for Japanese which track has the track ID "5." The image and audio reproduced on the basis of this fourth group information is a Japanese subtitle version of the 2D American movie.

The fifth group information includes track IDs "1," "4," and "6" and metadata "English (5.1 ch, Japanese Comment)." That is, the fifth group information indicates a combination of the track of the image of the 2D American movie which track has the track ID "1," the track of the 5.1-ch audio for English which track has the track ID "4," and the track of the 2D comment image for Japanese which track has the track ID "6." The image and audio reproduced on the basis of this fifth group information is the 2D American movie with a Japanese comment.

FIG. 6 is a diagram showing a second example of tracks recorded on the recording media 12.

In the example of FIG. 6, five tracks having track IDs of 1 to 5 are recorded on the recording media 12. The track having the track ID "1" is the track of a main image, and is formed by the image data of a 2D American movie. The track having the track ID "2" is a first audio track, and is formed by the audio data of 2-ch audio for Japanese. The track having the track ID "3" is a second audio track, and is formed by the audio data of 2-ch audio for English.

The track having the track ID "4" is the track of a first secondary image, and is formed by the image data of 2D forced subtitles for Japanese audio. Incidentally, the forced subtitles are subtitles for a main language which subtitles are to be displayed when audio as a reproduction object includes audio in a language different from a main language, and which subtitles correspond to the audio in the different language. For example, the forced subtitles are subtitles for Japanese which subtitles are to be displayed when the audio as a reproduction object is audio for Japanese and audio in a language other than Japanese is included in the middle of the audio for Japanese, and which subtitles correspond to the audio in the language other than Japanese. In addition, 2D forced subtitles for Japanese audio are 2D forced subtitles for Japanese which subtitles are to be displayed when audio for Japanese is set as a reproduction object.

The track having the track ID "5" is the track of a second secondary image, and is the image data of 2D subtitles for Japanese and 2D forced subtitles for Japanese.

FIG. 7 is a diagram showing an example of group information in a case where the tracks shown in FIG. 6 are recorded on the recording media 12.

In the example of FIG. 7, two pieces of group information are recorded on the recording media 12. The first group information includes track IDs "1," "2," and "4" and metadata "Dubbed in Japanese (Forced Subtitle)." That is, the first group information indicates a combination of the track of the image of the 2D American movie which track has the track ID "1," the track of the 2-ch audio for Japanese which track has the track ID "2," and the track of the 2D forced subtitles for Japanese audio which track has the track ID "4." The image and audio reproduced on the basis of this first group information is a Japanese-dubbed version of the 2D American movie with the forced subtitles.

The second group information includes track IDs "1," "3," and "5" and metadata "English Audio (Japanese Subtitles+ Forced Subtitles)." That is, the second group information indicates a combination of the track of the image of the 2D American movie which track has the track ID "1," the track of the 2-ch audio for English which track has the track ID "3," and the track of the 2D subtitles for Japanese and the 2D forced subtitles for Japanese which track has the track ID "5." The image and audio reproduced on the basis of this second group information is a Japanese subtitle version of the 2D American movie with the forced subtitles.

Figures 8, 9:
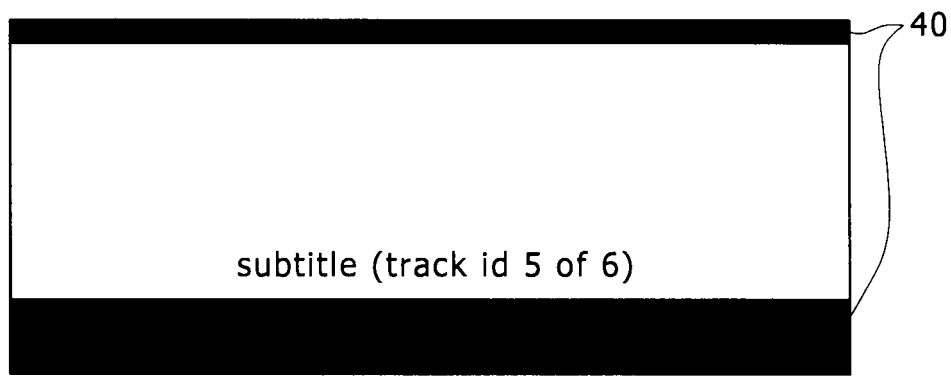
FIG. 8 is a diagram showing a third example of tracks.
FIG. 9 is a diagram of assistance in explaining a black band part of a screen.

FIG. 8 is a diagram showing a third example of tracks recorded on the recording media 12.

In the example of FIG. 8, seven tracks having track IDs of 1 to 7 are recorded on the recording media 12. The track having the track ID "1" is the track of a first main image, and is formed by the image data of a 2D American movie. The track having the track ID "2" is the track of a second main image, and is formed by the image data of a conversion image of the American movie.

The track having the track ID "3" is a first audio track, and is formed by the audio data of 2-ch audio for Japanese. The track having the track ID "4" is a second audio track, and is formed by the audio data of 2-ch audio for English.

The track having the track ID "5" is the track of a first secondary image, and is formed by the image data of 2D subtitles for Japanese. The track having the track ID "6" is the track of a second secondary image, and is formed by the image data of 3D subtitles for Japanese. The track having the track ID "7" is the track of a third secondary image, and is formed by the image data of 3D subtitles for Japanese which subtitles are displayed in a black band part of a screen (which subtitles will hereinafter be referred to as 3D Japanese black band subtitles).

Incidentally, a black band part of a screen is a black display region 40 disposed in an upper part or a lower part of the screen when a main image is a movie in a CinemaScope size or the like, as shown in FIG. 9.

FIG. 10 is a diagram showing an example of group information in a case where the tracks shown in FIG. 8 are recorded on the recording media 12.

In the example of FIG. 10, five pieces of group information are recorded on the recording media 12. The first group information includes track IDs "1" and "3" and metadata "[2D] Dubbed in Japanese." That is, the first group information indicates a combination of the track of the image of the 2D American movie which track has the track ID "1" and the track of the 2-ch audio for Japanese which track has the track ID "3." The image and audio reproduced on the basis of this first group information is a Japanese-dubbed version of the 2D American movie.

The second group information includes track IDs "1," "4," and "5" and metadata "[2D] English Audio and Japanese Subtitles." That is, the second group information indicates a combination of the track of the image of the 2D American movie which track has the track ID "1," the track of the 2-ch audio for English which track has the track ID "4," and the track of the 2D subtitles for Japanese which track has the track ID "5." The image and audio reproduced on the basis of this second group information is a Japanese subtitle version of the 2D American movie.

The third group information includes track IDs "1," "2," and "3" and metadata "[3D] Dubbed in Japanese." That is, the third group information indicates a combination of the track of the image of the 2D American movie which track has the track ID "1," the track of the conversion image of the American movie which track has the track ID "2," and the track of the 2-ch audio for Japanese which track has the track ID "3." The image and audio reproduced on the basis of this third group information is a Japanese-dubbed version of the 3D American movie.

The fourth group information includes track IDs "1," "2," "4," and "6" and metadata "[3D] English Audio and Japanese Subtitles." That is, the fourth group information indicates a combination of the track of the image of the 2D American movie which track has the track ID "1," the track of the conversion image of the American movie which track has the track ID "2," the track of the 2-ch audio for English which track has the track ID "4," and the track of the 3D subtitles for Japanese which track has the track ID "6." The image and audio reproduced on the basis of this fourth group information is a Japanese subtitle version of the 3D American movie.

The fifth group information includes track IDs "1," "2," "4," and "7" and metadata "[3D] English Audio and Japanese Subtitles 2." That is, the fifth group information indicates a combination of the track of the image of the 2D American movie which track has the track ID "1," the track of the conversion image of the American movie which track has the track ID "2," the track of the 2-ch audio for English which track has the track ID "4," and the track of the 3D Japanese black band subtitles which track has the track ID "7." The image and audio reproduced on the basis of this fifth group information is a Japanese black band subtitle version of the 3D American movie.

As described above, only group information indicating predetermined combinations, rather than group information indicating all combinations, is recorded on the recording media 12.

For example, the group information in FIG. 5 does not include group information indicating a combination of the tracks having the track IDs "1," "2," and "5." That is, because there are few users who desire to listen to the audio for Japanese and view the 2D subtitles for Japanese together with the image of the 2D American movie, the group information indicating the combination of the track of the image of the 2D American movie, the track of the audio for Japanese, and the track of the 2D subtitles for Japanese is not recorded on the recording media 12.

In addition, the group information in FIG. 7 does not include group information indicating combinations that do not include the track having the track ID "4" or "5." That is, because there are few users who do not need forced subtitles, the group information indicating the combinations that do not include the tracks including the forced subtitles is not recorded on the recording media 12.

Thus, when a user specifies group information as information indicating a combination of tracks as reproduction objects on a reproducing device for reproducing the recording media 12, which reproducing device will be described later, the user can select and specify desired group information quickly as compared with a case where group information indicating all combinations is recorded on the recording media 12.

[Description of Process of Data Generating Device]

Figure 11:
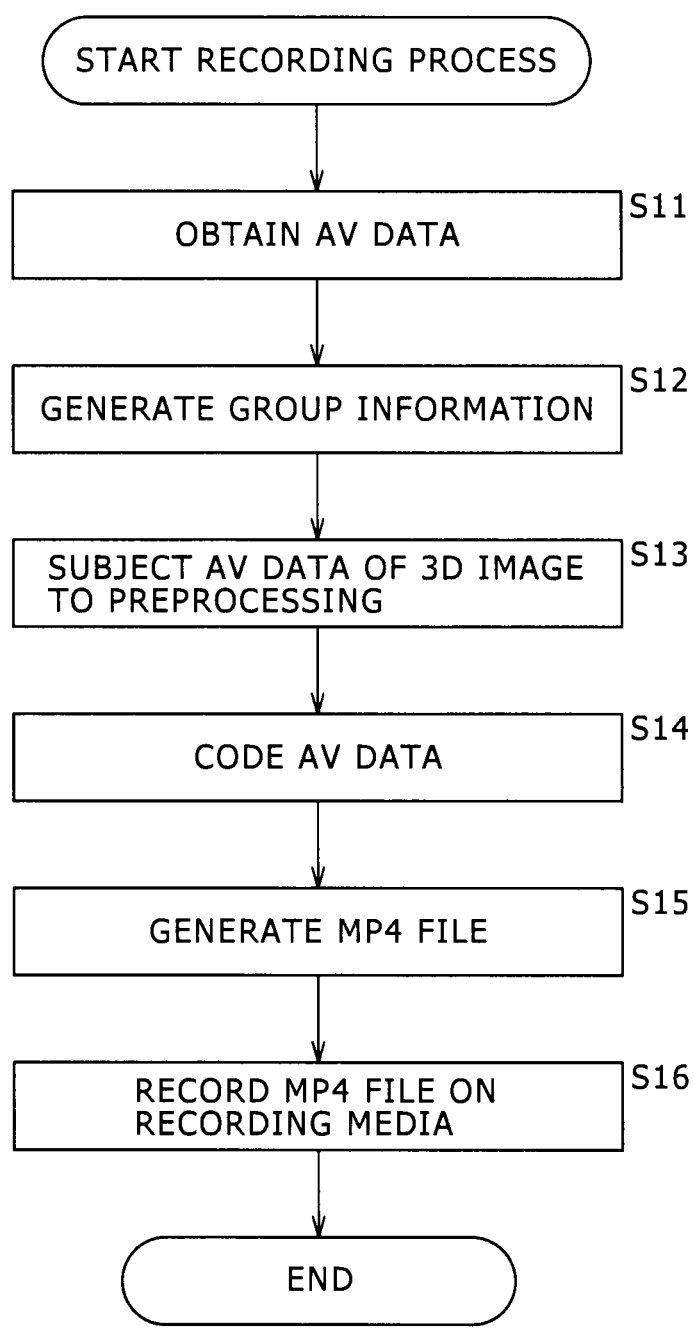
FIG. 11 is a flowchart of assistance in explaining a recording process.

FIG. 11 is a flowchart of assistance in explaining a recording process by the recording device 10 of FIG. 1.

In step S11, the data input section 21 obtains AV data such as 2D main images, 3D main images, conversion images, audio for various languages, 2D secondary images for various languages, 3D secondary images for various languages, and the like from the outside of the recording device 10. The data input section 21 supplies the AV data to the data coding section 22.

In step S12, the data input section 21 generates group information according to an instruction from the control section 14, and supplies the group information to the data coding section 22.

In step S13, the preprocessing section 31 in the data coding section 22 applies the preprocessing of a predetermined system to the AV data in track units of the 3D main images and the 3D secondary images as 3D images supplied from the data input section 21. In addition, the preprocessing section 31 supplies the AV data other than the AV data of the 3D main images and the 3D secondary images and the group information supplied from the data input section 21 to the encoding section 32 as they are.

In step S14, the encoding section 32 codes the AV data in track units which AV data is supplied from the preprocessing section 31 by a system in accordance with MP4. The encoding section 32 supplies an AV stream in track units which AV stream is obtained as a result of the coding to the file generating section 33. In addition, the encoding section 32 supplies the file generating section 33 with the group information as it is.

In step S15, the file generating section 33 generates an MP4 file using the AV stream in track units and the group information supplied from the encoding section 32 and management information for each track which management information is supplied from the control section 14. The file generating section 33 supplies the generated MP4 file to the recording section 23.

In step S16, the recording section 23 supplies the MP4 file supplied from the file generating section 33 to the recording media 12 to make the MP4 file recorded on the recording media 12. The process is then ended.

As described above, the recording device 10 disposes the group information in the MP4 file. Thus, the reproducing device to be described later can present the group information to the user. As a result, by merely selecting desired group information from the presented group information, the user can easily specify a combination of tracks indicated by the group information as reproduction objects. In addition, the user of the recording device 10 can make the user of the reproducing device to be described later recognize a combination of appropriate tracks intended by the user of the recording device 10.

[Example of Configuration of an Embodiment of Reproducing Device]

Figure 12:
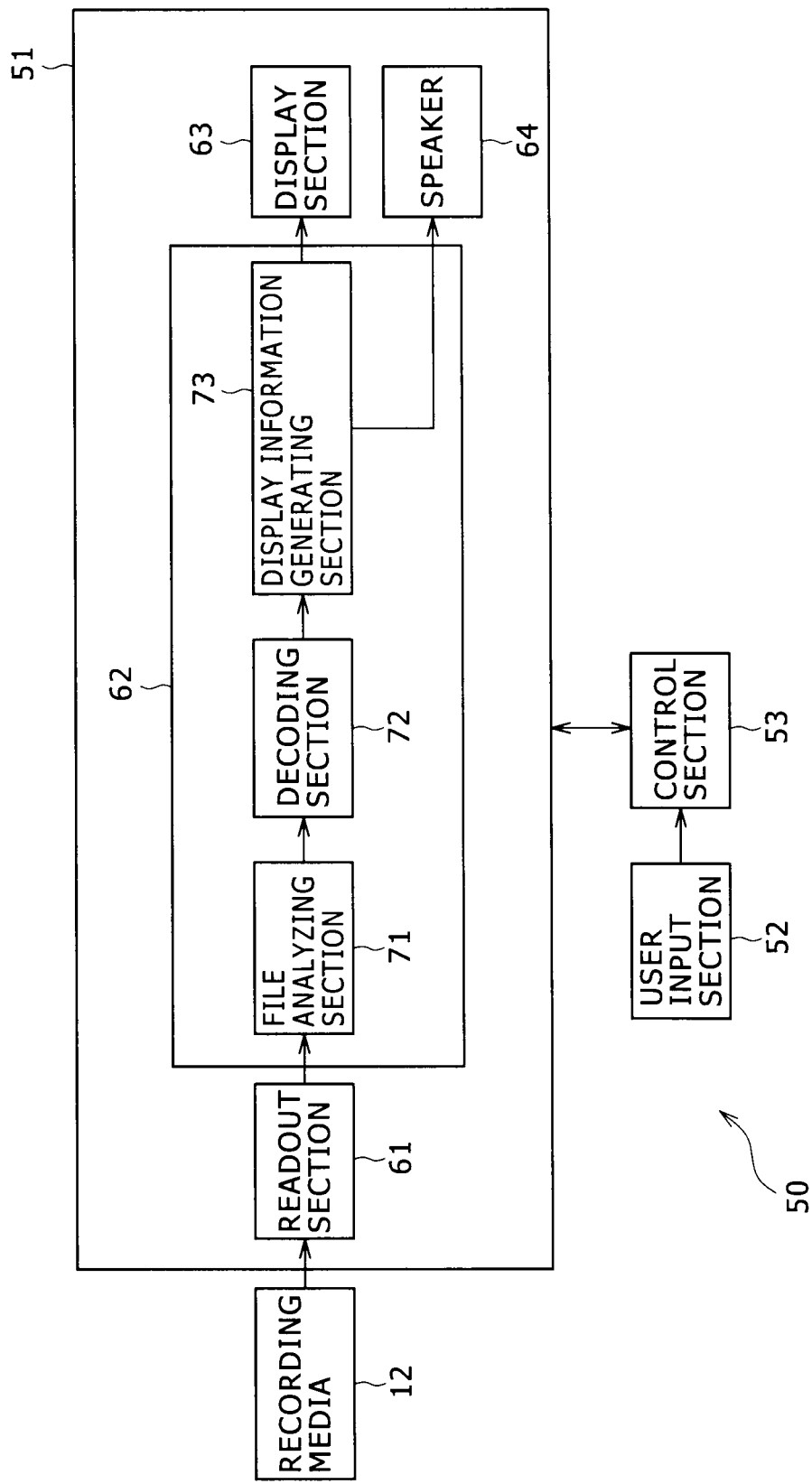
FIG. 12 is a block diagram showing an example of configuration of one embodiment of a reproducing device as a data processing device to which the present technology is applied.

FIG. 12 is a block diagram showing an example of configuration of an embodiment of a reproducing device as a data processing device to which the present technology is applied.

The reproducing device 50 of FIG. 12 includes recording media 12, a reproduction processing section 51, a user input section 52, and a control section 53. The reproducing device 50 reproduces an MP4 file from the recording media 12 on which the MP4 file has been recorded by the recording device 10 of FIG. 1.

Specifically, the reproduction processing section 51 includes a readout section 61, a data decoding section 62, a display section 63, and a speaker 64.

The readout section 61 (obtaining means) in the reproduction processing section 51 reads and obtains the MP4 file recorded on the recording media 12. The readout section 61 supplies the MP4 file to the data decoding section 62.

The data decoding section 62 includes a file analyzing section 71, a decoding section 72, and a display information generating section 73.

The file analyzing section 71 in the data decoding section 62 analyzes the MP4 file supplied from the readout section 61, and obtains information disposed in each of a file type box and a movie box. The file analyzing section 71 then supplies the control section 53 with group information disposed in a presentation track group box of the movie box and management information for each track which management information is disposed in a box for each track. In addition, according to an instruction from the control section 53, the file analyzing section 71 analyzes the MP4 file, obtains an AV stream of tracks as reproduction objects disposed in a real data box, and supplies the AV stream to the decoding section 72.

The decoding section 72 (decoding means) decodes the AV stream supplied from the file analyzing section 71 by a system corresponding to the coding system of the encoding section 32 in FIG. 1 under control of the control section 53. The decoding section 72 supplies AV data obtained as a result of the decoding to the display information generating section 73.

The display information generating section 73 effects display of a menu screen on the display section 63 on the basis of the AV data of the menu screen supplied from the decoding section 72 according to an instruction from the control section 53. In addition, the display information generating section 73 (display controlling means) effects display of a screen for selecting tracks to be set as reproduction objects on the display section 63 on the basis of the management information or the group information supplied from the control section 53.

The display information generating section 73 applies the postprocessing of a system corresponding to the preprocessing section 31 in FIG. 1 to the AV data of a 3D main image and a 3D secondary image as 3D images supplied from the decoding section 72, and generates the AV data of an image for a left eye and an image for a right eye. In addition, the display information generating section 73 generates the AV data of an image for a left eye and an image for a right eye using the AV data of a 2D main image and a conversion image supplied from the decoding section 72.

On the basis of the generated AV data of the image for the left eye and the image for the right eye, the display information generating section 73 effects display of a 3D main image and a 3D secondary image corresponding to the AV data on the display section 63. In addition, on the basis of the AV data of images other than the 3D main image, the 3D secondary image, and the conversion image supplied from the decoding section 72, the display information generating section 73 effects display of a 2D main image and a 2D secondary image corresponding to the AV data on the display section 63. In addition, on the basis of the AV data of audio, the display information generating section 73 outputs the audio corresponding to the AV data to the speaker 64.

The user input section 52 includes an operating button and the like. The user input section 52 receives an instruction from a user, and supplies the instruction to the control section 53.

The control section 53 performs processing such as control and the like on each part of the reproduction processing section 51. For example, the control section 53 supplies the management information or the group information to the display information generating section 73 according to an instruction from the user input section 52. In addition, the control section 53 determines tracks as reproduction objects on the basis of an instruction from the user input section 52 and the management information or the group information. The control section 53 then instructs the file analyzing section 71 to obtain the AV stream of the tracks as reproduction objects.

[Example of Screen Displayed on Display Section]

Figure 13:
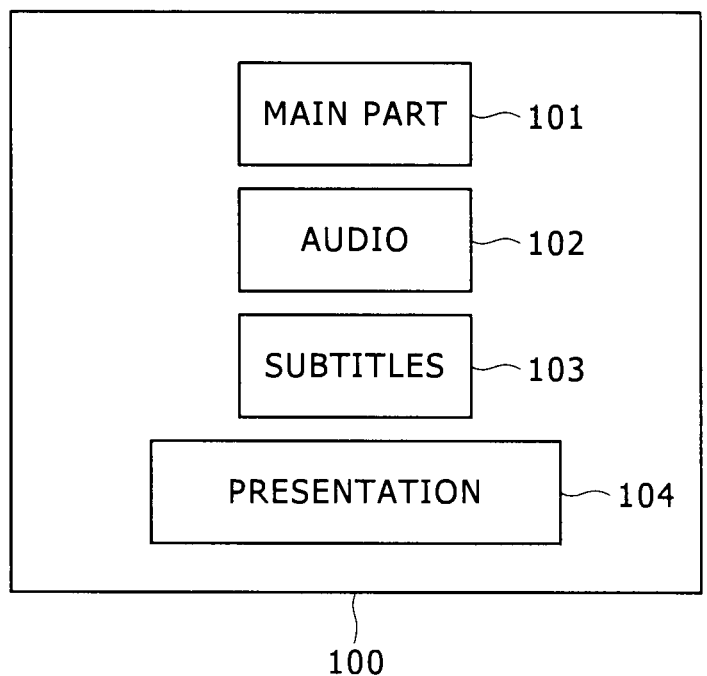
FIG. 13 is a diagram showing an example of a menu screen.
Figure 14:
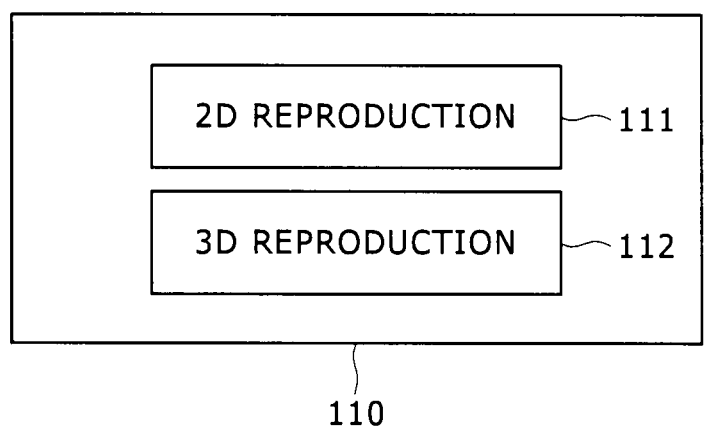
FIG. 14 is a diagram showing an example of a screen displayed when a main part button is selected.
Figure 15:
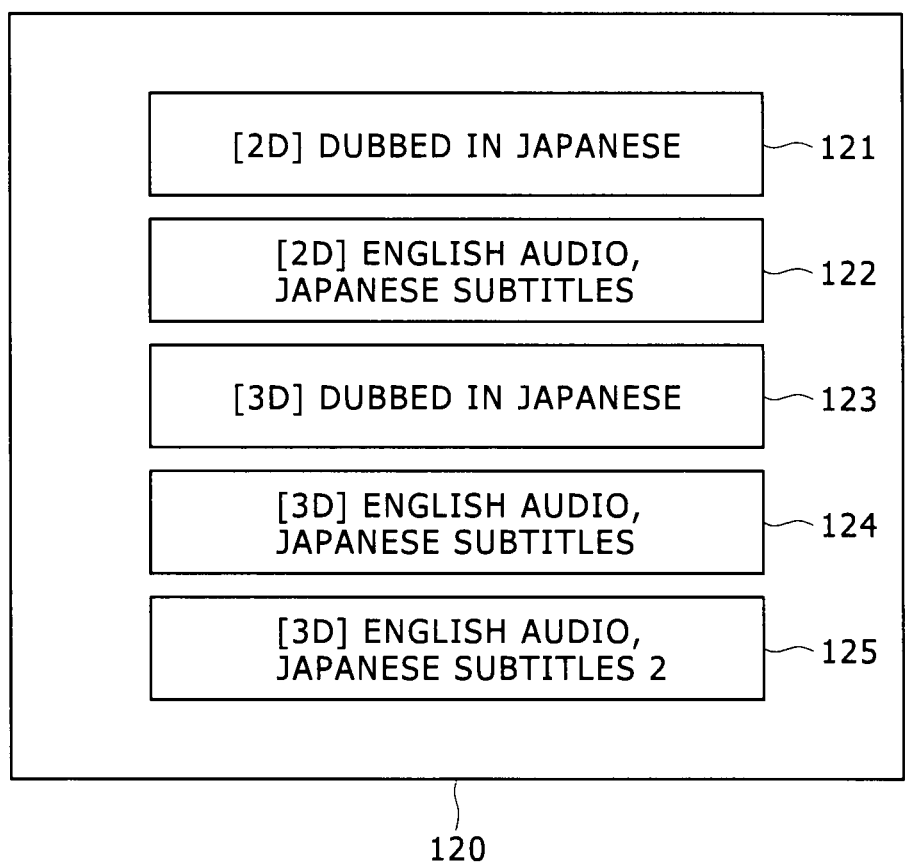
FIG. 15 is a diagram showing an example of a screen displayed when a presentation button is selected.

FIGS. 13 to 15 are diagrams showing an example of a screen displayed on the display section 63.

Incidentally, FIGS. 13 to 15 are diagrams showing an example of a screen in a case where the tracks shown in FIG. 8 and the group information shown in FIG. 10 are recorded on the recording media 12.

FIG. 13 is a diagram showing an example of a menu screen. As shown in FIG. 13, the menu screen 100 includes a main part button 101, an audio button 102, a subtitle button 103, and a presentation button 104.

The main part button 101 is selected to display a screen for selecting the track of an image of the American movie as a reproduction object. The audio button 102 is selected to display a screen for selecting the track of audio as a reproduction object. The subtitle button 103 is selected to display a screen for selecting the track of subtitles as a reproduction object. The presentation button 104 is selected to display a screen for selecting group information indicating a combination of tracks as reproduction objects.

When the user gives an instruction to select the main part button 101 on the menu screen 100 of FIG. 13 by operating the user input section 52, the display section 63 displays a screen 110 shown in FIG. 14.

Specifically, the control section 53 supplies management information for the tracks of main images to the display information generating section 73 according to the instruction to select the main part button 101 which instruction is supplied from the user input section 52. The display information generating section 73 effects display of a 2D reproduction button 111 indicating the contents of the track having the track ID "1" and a 3D reproduction button 112 indicating the contents of the track having the track ID "2" on the basis of information indicating the contents of the tracks which information is included in the management information for the tracks of the main images which management information is supplied from the control section 53.

The 2D reproduction button 111 is selected to set the track of the image of the 2D American movie which track has the track ID "1" as a reproduction object. The 3D reproduction button 112 is selected to display the image of the 3D American movie with the track of the image of the 2D American movie which track has the track ID "1" and the track of the conversion image of the American movie which track has the track ID "2" as reproduction objects.

Incidentally, though not shown in the figures, as in the case where the main part button 101 is selected, when the audio button 102 or the subtitle button 103 is selected, buttons indicating the contents of respective tracks of audio or secondary images are displayed on the basis of information indicating the contents of the tracks which information is included in the management information for the tracks of the audio or the secondary images.

On the other hand, when the user gives an instruction to select the presentation button 104 on the menu screen 100 of FIG. 13 by operating the user input section 52, the display section 63 displays a screen 120 shown in FIG. 15.

Specifically, the control section 53 supplies group information to the display information generating section 73 according to the instruction to select the presentation button 104 which instruction is supplied from the user input section 52. On the basis of the metadata included in the group information supplied from the control section 53, the display information generating section 73 effects display of a "[2D] Dubbed in Japanese" button 121 corresponding to the metadata of the first group information, a "[2D] English Audio and Japanese Subtitles" button 122 corresponding to the metadata of the second group information, a "[3D] Dubbed in Japanese" button 123 corresponding to the metadata of the third group information, a "[3D] English Audio and Japanese Subtitles" button 124 corresponding to the metadata of the fourth group information, and a "[3D] English Audio and Japanese Subtitles 2" button 125 corresponding to the metadata of the fifth group information.

The "[2D] Dubbed in Japanese" button 121 is selected to set the combination of the tracks indicated by the first group information, that is, the tracks having the track IDs "1" and "3," as reproduction objects. The "[2D] English Audio and Japanese Subtitles" button 122 is selected to set the combination of the tracks indicated by the second group information, that is, the tracks having the track IDs "1," "4," and "5," as reproduction objects. The "[3D] Dubbed in Japanese" button 123 is selected to set the combination of the tracks indicated by the third group information, that is, the tracks having the track IDs "1," "2," and "3," as reproduction objects.

The "[3D] English Audio and Japanese Subtitles" button 124 is selected to set the combination of the tracks indicated by the fourth group information, that is, the tracks having the track IDs "1," "2," "4," and "6," as reproduction objects. The "[3D] English Audio and Japanese Subtitles 2" button 125 is selected to set the combination of the tracks indicated by the fifth group information, that is, the tracks having the track IDs "1," "2," "4," and "7," as reproduction objects.

[Description of Process of Reproducing Device]

Figure 16:
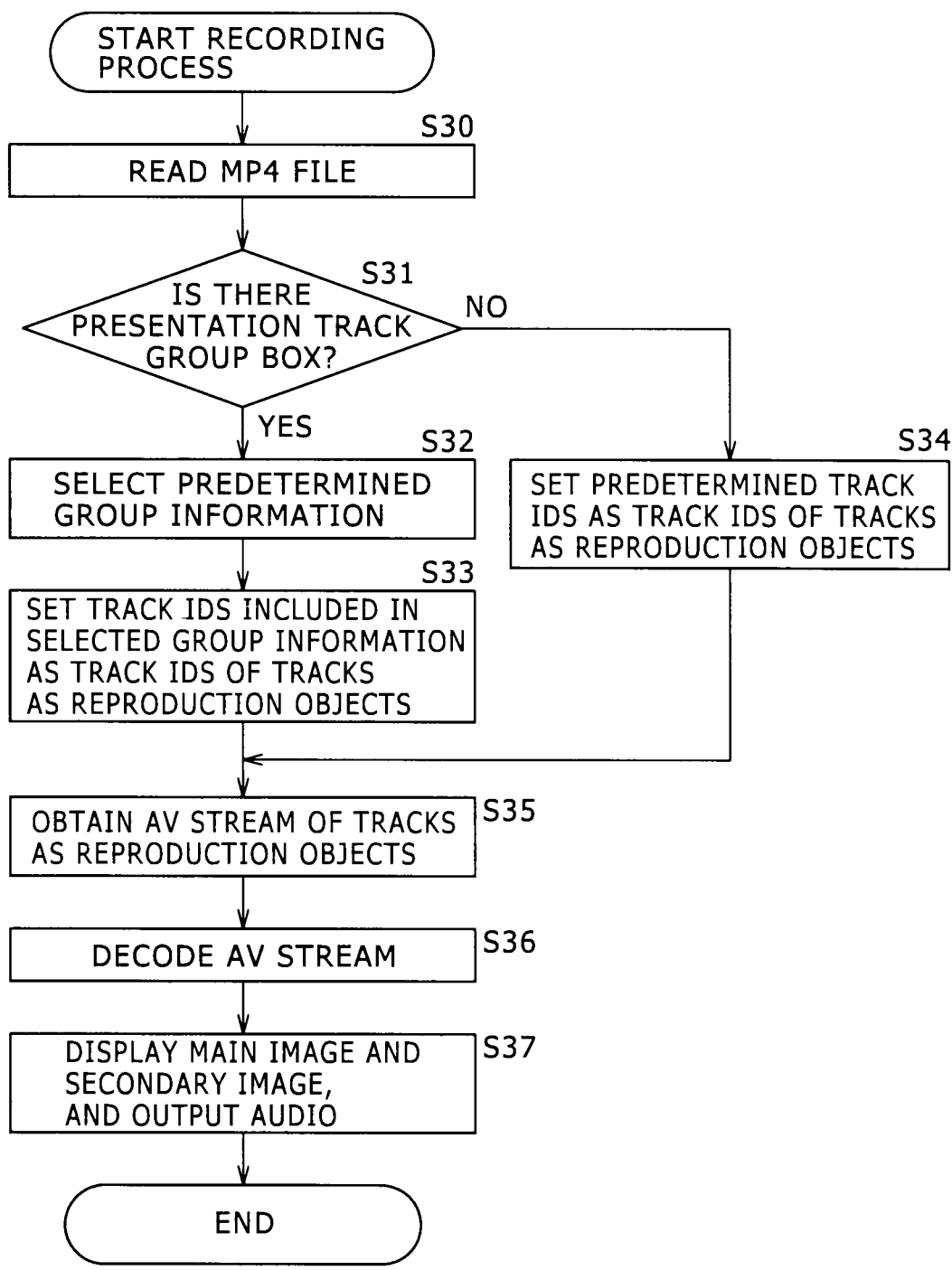
FIG. 16 is a flowchart of assistance in explaining a reproducing process.

FIG. 16 is a flowchart of assistance in explaining a reproducing process by the reproducing device 50 of FIG. 12. This reproducing process is started when the user gives an instruction to reproduce the recording media 12 by operating the user input section 52, for example.

In step S30 in FIG. 16, according to an instruction from the control section 53 which instruction corresponds to the reproducing instruction from the user, the readout section 61 reads an MP4 file recorded on the recording media 12, and supplies the MP4 file to the data decoding section 62.

In step S31, the file analyzing section 71 analyzes the MP4 file supplied from the readout section 61, and determines whether there is a presentation track group box in a movie box of the MP4 file.

When it is determined in step S31 that there is a presentation track group box, the file analyzing section 71 supplies group information disposed in the presentation track group box to the control section 53. The file analyzing section 71 also supplies management information for each track which management information is disposed in a box for each track in the movie box to the control section 53.

Then, in step S32, the control section 53 selects predetermined group information from the group information supplied from the file analyzing section 71.

A first group information selecting method is for example a method of selecting group information at a first position. In this case, the user of the recording device 10 (producer of the recording media 12) disposes the group information intended by the user of the recording device 10 at a first position. Thereby, the group information intended by the user of the recording device 10 can be made to be selected at a time of reproduction of the recording media 12.

A second group information selecting method is for example a method of selecting group information including the track of audio for the language of a country in which the reproducing device 50 is used. When this method is used, the control section 53 recognizes track IDs included in each piece of group information, and recognizes the contents of tracks having the track IDs from management information for the tracks. The control section 53 then selects group information including the track ID of a track whose contents are audio for the language of the country in which the reproducing device 50 is used. Incidentally, when there are a plurality of pieces of group information including the track ID of a track whose contents are audio for the language of the country in which the reproducing device 50 is used, group information detected first is selected, for example.

A third group information selecting method is for example a method of selecting group information including the track of subtitles for the language of a country in which the reproducing device 50 is used. When this method is used, the control section 53 recognizes track IDs included in each piece of group information, and recognizes the contents of tracks having the track IDs from management information for the tracks. The control section 53 then selects group information including the track ID of a track whose contents are subtitles for the language of the country in which the reproducing device 50 is used. Incidentally, when there are a plurality of pieces of group information including the track ID of a track whose contents are subtitles for the language of the country in which the reproducing device 50 is used, group information detected first is selected, for example.

Incidentally, the language of the country in which the reproducing device 50 is used, which language is used by the second selecting method and the third selecting method, is specified by the user via the user input section 52, for example.

In step S33, the control section 53 sets all track IDs included in the group information selected in step S32 as the track IDs of tracks as reproduction objects. Then, the control section 53 instructs the file analyzing section 71 to obtain an AV stream of the tracks having the track IDs, and advances the process to step S35.

On the other hand, when it is determined in step S31 that there is no presentation track group box, the file analyzing section 71 supplies management information for each track, which management information is disposed in the box for each track in the movie box, to the control section 53.

Then, in step S34, the control section 53 sets predetermined track IDs, which are set in advance as initial values of track IDs, as the track IDs of tracks as reproduction objects.

The initial values of the track IDs are for example disposed in the movie box, and supplied to the control section 53 via the file analyzing section 71. After the process of step S34, the control section 53 instructs the file analyzing section 71 to obtain the AV stream of the tracks having the set track IDs, and then advances the process to step S35.

In step S35, according to the instruction from the control section 53, the file analyzing section 71 analyzes the MP4 file, obtains the AV stream of the tracks as reproduction objects disposed in the real data box, and supplies the AV stream to the decoding section 72.

In step S36, the decoding section 72 decodes the AV stream supplied from the file analyzing section 71 by a system corresponding to the coding system of the encoding section 32 in FIG. 1 under control of the control section 53. The decoding section 72 supplies AV data obtained as a result of the decoding to the display information generating section 73.

In step S37, on the basis of the AV data supplied from the decoding section 72, the display information generating section 73 effects display of a main image and a secondary image corresponding to the AV data on the display section 63, and outputs audio corresponding to the AV data to the speaker 64. The process is then ended.

FIG. 17 is a flowchart of assistance in explaining a track changing process for changing tracks as reproduction objects, which process is performed by the reproducing device 50 in FIG. 12. This track changing process is started when the user gives an instruction to display the menu screen by operating the user input section 52, for example.

Incidentally, while the track changing process in the case where the tracks shown in FIG. 8 and the group information shown in FIG. 10 are recorded on the recording media 12 will be described with reference to FIG. 17, a similar process is performed also in cases where other tracks and other group information are recorded on the recording media 12, with only the kinds of displayed buttons different.

In step S51 in FIG. 17, the display information generating section 73 effects display of the menu screen 100 on the display section 63 on the basis of the AV data of the menu screen supplied from the decoding section 72 according to an instruction from the control section 53 which instruction corresponds to the instruction of the user to display the menu screen 100.

In step S52, the control section 53 determines whether the presentation button 104 within the menu screen 100 is selected. When it is determined in step S52 that the presentation button 104 is selected, the control section 53 supplies the group information to the display information generating section 73.

Then, in step S53, the display information generating section 73 effects display of the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, and the "[3D] English Audio and Japanese Subtitles 2" button 125 in FIG. 15 on the basis of the metadata included in the group information supplied from the control section 53.

In step S54, the control section 53 determines whether one of the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, and the "[3D] English Audio and Japanese Subtitles 2" button 125 is selected.

When it is determined in step S54 that none of the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, and the "[3D] English Audio and Japanese Subtitles 2" button 125 is selected, the control section 53 waits until one of the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, and the "[3D] English Audio and Japanese Subtitles 2" button 125 is selected.

When it is determined in step S54 that one of the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, and the "[3D] English Audio and Japanese Subtitles 2" button 125 is selected, the process proceeds to step S55.

In step S55, the control section 53 changes the track IDs of tracks set as reproduction objects to the track IDs included in the group information corresponding to the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, or the "[3D] English Audio and Japanese Subtitles 2" button 125 that is selected.

That is, the control section 53 (selecting means) selects, as a combination of tracks as reproduction objects, the combination indicated by the group information corresponding to the "[2D] Dubbed in Japanese" button 121, the "[2D] English Audio and Japanese Subtitles" button 122, the "[3D] Dubbed in Japanese" button 123, the "[3D] English Audio and Japanese Subtitles" button 124, or the "[3D] English Audio and Japanese Subtitles 2" button 125 that is selected. The process is then ended.

On the other hand, when it is determined in step S52 that the presentation button 104 is not selected, the control section 53 in step S56 determines whether the main part button 101 is selected.

When it is determined in step S56 that the main part button 101 is selected, the control section 53 supplies management information for the tracks of main images to the display information generating section 73.

Then, in step S57, the display information generating section 73 effects display of the 2D reproduction button 111 and the 3D reproduction button 112 in FIG. 14 on the basis of information indicating the contents of the tracks of the main images which information is included in the management information for the tracks of the main images which management information is supplied from the control section 53.

In step S58, the control section 53 determines whether one of the 2D reproduction button 111 and the 3D reproduction button 112 is selected. When it is determined in step S58 that none of the 2D reproduction button 111 and the 3D reproduction button 112 is selected, the control section 53 waits until one of the 2D reproduction button 111 and the 3D reproduction button 112 is selected.

When it is determined in step S58 that one of the 2D reproduction button 111 and the 3D reproduction button 112 is selected, the process proceeds to step S59.

In step S59, the control section 53 changes the track ID of the track of a main image set as a reproduction object to the track ID of the track of a main image corresponding to the 2D reproduction button 111 or the 3D reproduction button 112 that is selected. The process is then ended.

When it is determined in step S56 that the main part button 101 is not selected, on the other hand, the control section 53 in step S60 determines whether the audio button 102 is selected.

When it is determined in step S60 that the audio button 102 is selected, the control section 53 in step S61 supplies management information for the tracks of audio to the display information generating section 73.

Then, in step S61, the display information generating section 73 effects display of various buttons on the basis of information indicating the contents of the tracks of the audio which information is included in the management information for the tracks of the audio which management information is supplied from the control section 53.

In step S62, the control section 53 determines whether one of the buttons displayed in step S61 is selected. When it is determined in step S62 that none of the buttons displayed in step S61 is selected, the control section 53 waits until one of the buttons displayed in step S61 is selected.

When it is determined in step S62 that one of the buttons displayed in step S61 is selected, the process proceeds to step S63. In step S63, the control section 53 changes the track ID of the track of audio set as a reproduction object to the track ID of the track of audio corresponding to the selected button. The process is then ended.

When it is determined in step S60 that the audio button 102 is not selected, on the other hand, the control section 53 in step S64 determines whether the subtitle button 103 is selected.

When it is determined in step S64 that the subtitle button 103 is not selected, the process returns to step S52 to repeat the processes of steps S52, S56, S60, and S64 until the presentation button 104, the main part button 101, the audio button 102, or the subtitle button 103 is selected.

When it is determined in step S64 that the subtitle button 103 is selected, on the other hand, the control section 53 in step S65 supplies management information for the tracks of subtitles to the display information generating section 73.

Then, in step S65, the display information generating section 73 effects display of various buttons on the basis of information indicating the contents of the tracks of the subtitles which information is included in the management information for the tracks of the subtitles which management information is supplied from the control section 53.

In step S66, the control section 53 determines whether one of the buttons displayed in step S65 is selected. When it is determined in step S66 that none of the buttons displayed in step S65 is selected, the control section 53 waits until one of the buttons displayed in step S65 is selected.

When it is determined in step S66 that one of the buttons displayed in step S65 is selected, the process proceeds to step S67. In step S67, the control section 53 changes the track ID of the track of subtitles set as a reproduction object to the track ID of the track of subtitles corresponding to the selected button. The process is then ended.

As described above, the reproducing device 50 obtains an MP4 file having group information disposed therein, and on the basis of the group information, displays the screen 120 for selecting group information indicating a combination of tracks as reproduction objects. Thus, by merely selecting a button corresponding to desired group information on the screen 120, the user can easily select a combination of tracks indicated by the group information as reproduction objects.

Incidentally, in the present embodiment, the MP4 file is recorded on the recording media 12. However, the MP4 file may be transmitted via a predetermined network.

[Description of Computer to which Present Technology is Applied]

Next, the series of processes described above can be not only performed by hardware but also performed by software.

When the series of processes is performed by software, a program constituting the software is installed onto a general-purpose computer or the like.

FIG. 18 shows an example of configuration of one embodiment of a computer onto which the program for performing the series of processes described above is installed.

The program can be recorded in advance in a storage section 208 or a ROM (Read Only Memory) 202 as a recording medium included in the computer.

Alternatively, the program can be stored (recorded) on removable media 211. Such removable media 211 can be provided as so-called packaged software. In this case, the removable media 211 include for example a flexible disk, a CD-ROM (Compact Disk Read Only Memory), an MO (Magneto Optical) disk, a DVD (Digital Versatile Disk), a magnetic disk, and a semiconductor memory.

Incidentally, the program can be not only installed from the removable media 211 as described above onto the computer via a drive 210 but also downloaded to the computer via a communication network or a broadcasting network and installed into the built-in storage section 208. Specifically, the program can be for example transferred from a download site to the computer by radio via an artificial satellite for digital satellite broadcasting or transferred to the computer by wire via a network such as a LAN (Local Area Network), the Internet or the like.

The computer includes a CPU (Central Processing Unit) 201. The CPU 201 is connected with an input-output interface 205 via a bus 204.

When a command is input to the CPU 201 via the input-output interface 205 by an operation of an input section 206 by the user or the like, the CPU 201 executes the program stored in the ROM 202 according to the command. Alternatively, the CPU 201 loads the program stored in the storage section 208 into a RAM (Random Access Memory) 203, and then executes the program.

The CPU 201 thereby performs the processes according to the above-described flowcharts or processes performed by the configurations of the above-described block diagrams. Then, the CPU 201 for example outputs a result of a process from an output section 207 via the input-output interface 205, transmits the result of the process from a communicating section 209 via the input-output interface 205, or records the result of the process in the storage section 208 via the input-output interface 205, as required.

Incidentally, the input section 206 includes a keyboard, a mouse, a microphone and the like. The input section 206 corresponds to the user input section 13 and the user input section 52. The output section 207 includes an LCD (Liquid Crystal Display), a speaker and the like. The output section 207 corresponds to for example the display section 63 and the speaker 64. The recording media 12 may be inserted into the computer via a drive not shown in the figure, or may be included in the computer as a part of the storage section 208.

In the present specification, the processes performed by the computer according to the program do not necessarily need to be performed in time series in the order described in the flowcharts. That is, processes performed by the computer according to the program also include processes performed in parallel or individually (for example parallel processing or processing according to objects).

In addition, the program may be processed by one computer (processor), or may be subjected to a distributed processing by a plurality of computers. Further, the program may be transferred to a remote computer to be executed.

It is to be noted that in the present specification, the steps describing the program stored on a program recording medium include not only processes performed in time series in the described order but also processes not necessarily performed in time series but performed in parallel or individually.

In addition, embodiments of the present disclosure are not limited to the foregoing embodiments, and various changes can be made without departing from the spirit of the present disclosure.

The present disclosure contains subject matter related to that disclosed in Japanese Priority Patent Application JP 2010-173600 filed in the Japan Patent Office on Aug. 2, 2010, the entire content of which is hereby incorporated by reference.

What is claimed is:

1. A data generating device comprising:
  circuitry configured to:
    code a plurality of kinds of data, each kind of data corresponding to an individual track of audio/video (A/V) content, and generating coded data;
    generate a plurality of pieces of group information and metadata corresponding to each of the plurality of pieces of group information, each piece of group information identifying a combination of the individual tracks of the A/V content; and
    generate a coded data storage file including said coded data of the plurality of kinds of said data and the plurality of pieces of said group information, wherein
  the individual tracks of the A/V content include at least a main image track, a secondary image track, a first audio track and a second audio track, and
  the circuitry is configured to generate a first piece of group information identifying a combination of at least the main image track and the first audio track, and generate a second piece of group information identifying a combination of the main image track, the secondary image track and the second audio track.

2. The data generating device according to claim 1, wherein said coded data storage file is an MP4 file, and said circuitry is configured to dispose the plurality of pieces of said group information in a movie box of said MP4 file.

3. The data generating device according to claim 1, wherein said plurality of kinds of data are image data of a main image, image data of a secondary image, and audio data.

4. The data generating device according to claim 1, wherein said plurality of kinds of data are image data of a three-dimensional main image, image data of a three-dimensional secondary image, and audio data.

5. The data generating device according to claim 1, wherein the circuitry is configured to generate a third piece of group information identifying a combination of the main image track and the first audio track, and generate a fourth piece of group information identifying a combination of the main image track and the second audio track.

6. The data generating device according to claim 5, wherein the individual tracks of the A/V content further include a third audio track, and
the circuitry is configured to generate a fifth piece of group information identifying a combination of the main image track and the third audio track.

7. The data generating device according to claim 6, wherein
the main image track corresponds to a main video image,
the first audio track corresponds an audio track in English at a first audio quality, the second audio track corresponds to a non-English audio track at a second audio quality that is worse than the first audio quality, the third audio track corresponds to an English audio track at the second audio quality, and the first secondary image track corresponds to non-English subtitle image data.

8. A data generating method executed by a data generating device comprising:

coding a plurality of kinds of data, each kind of data corresponding to an individual track of audio/video (A/V) content, and generating coded data;

generating a plurality of pieces of group information and metadata corresponding to each of the plurality of pieces of group information, each piece of group information identifying a combination of the individual tracks of the A/V content; and generating a coded data storage file including said coded data of the plurality of kinds of said data and the plurality of pieces of said group information, wherein the individual tracks of the A/V content include at least a main image track, a secondary image track, a first audio track and a second audio track, and the generating the plurality of pieces of group information includes generating a first piece of group information identifying a combination of at least the main image track and the first audio track, and generating a second piece of group information identifying a combination of the main image track, the secondary image track and the second audio track.

9. A non-transitory computer-readable medium including computer program instruction, which when executed by a data generating device, causes the data generating device to:

code a plurality of kinds of data, each kind of data corresponding to an individual track of audio/video (A/V) content, and generate coded data;

generate a plurality of pieces of group information and metadata corresponding to each of the plurality of pieces of group information, each piece of group information identifying a combination of the individual tracks of the A/V content; and generate a coded data storage file including said coded data of the plurality of kinds of said data and the plurality of pieces of said group information, wherein the individual tracks of the A/V content include at least a main image track, a secondary image track, a first audio track and a second audio track, and the generating the plurality of pieces of group information includes generating a first piece of group information identifying a combination of at least the main image track and the first audio track, and generating a second piece of group information identifying a combination of the main image track, the secondary image track and the second audio track.

\* \* \* \* \*